United States Patent Office 3,350,526
Patented Oct. 31, 1967

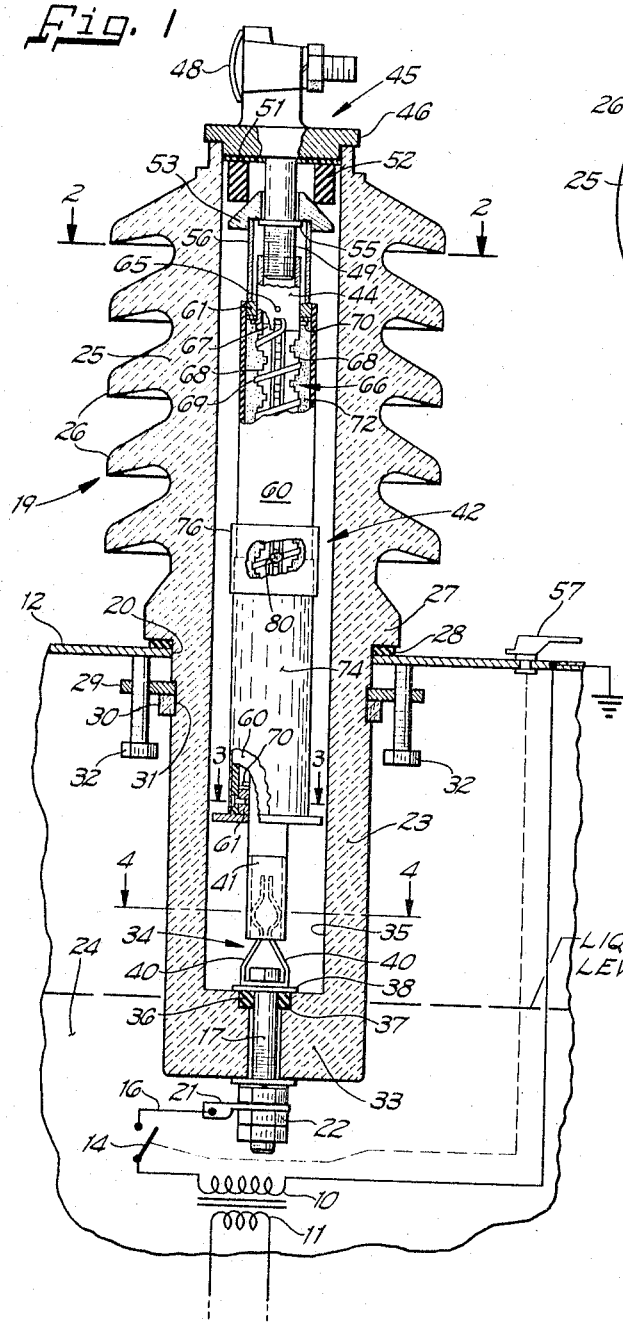

3,350,526
ELECTRICAL APPARATUS PROTECTED BY INTERNALLY MOUNTED FUSE
David W. Anderson, Zanesville, Ohio, assignor to McGraw-Edison Company, Milwaukee, Wis., a corporation of Delaware
Filed Oct. 29, 1964, Ser. No. 407,390
9 Claims. (Cl. 200—120)

ABSTRACT OF THE DISCLOSURE

A device for sealing a fuse within a bushing which extends into a casing containing electrical apparatus. The bushing has a closed bottom end and an open top end covered by a rotatable cap connected to the fuse. The fuse has a conical shaped end position beneath the cap. An annular gasket is positioned between the fuse end and the cap. The fuse is held against rotational movement but is movable toward the cap upon rotation of the cap to compress the gasket between the fuse end and the bushing and thereby seal the fuse within the bushing.

---

This invention relates to the protection of electrical apparatus and, in particular, to electrical apparatus having internally mounted protective means capable of interrupting fault current of short circuit magnitude.

High voltage electrical apparatus such as a distribution transformer may be protected by either: (1) a fuse link in series with the primary winding, or (2) the combination of a primary fuse link and a secondary circuit breaker coordinated with the primary link so that the fuse link operates in response to high magnitude fault currents resulting from failure within the transformer and the breaker opens the second circuit in response to overload current. The principal purpose of the primary fuse is to disconnect its associated transformer from the primary feeder when a transformer fault or low impedance secondary-fault occurs so as to prevent interruption of service to other loads supplied over the feeder. Transformer primary fuses are usually of the expulsion type and are mounted in a fused cutout separately on the pole because of the large quantities of gas and ionized particles evolved upon fuse operation. Primary fuse links mounted internally of the casing are sometimes used in small kva. distribution transformers, but they are difficult to change in that replacement necessitates opening of the casing and exposing the liquid dielectric to the atmosphere. Outages and interruption of customer service frequently occurs with distribution transformers protected by the combination of primary fuse and secondary breaker as a result of operation of the breaker during heat storms and other severe overloads, or as a result of the blowing of a back-up fuse on a branch circuit.

Transformer fuses provide no protection to the transformer itself against a low impedance internal fault when the available fault current is relatively high. An expulsion fuse requires at least one half cycle to one cycle to clear the circuit, and even when the primary fuse is capable of clearing high magnitude current, fault current above several thousand amperes persisting for one cycle may result in blowing off the transformer cover, discharge of flaming oil, and severe damage to the transformer. When the primary fuse is incapable of interrupting the fault current or requires more than one cycle to clear the fault, the entire transformer casing may explode and the hazard to personnel and surrounding apparatus from explosion and flaming oil is still greater. Application Ser. No. 289,882, filed January 31, 1963, now Patent No. 3,235,696, issued February 15, 1966 in the name of Harvey W. Mikulecky and having the same assignee as the present invention, discloses a disconnectable non-expulsion current limiting device for protecting electrical apparatus which is capable of interrupting current of short circuit magnitude without operation of a back-up device and without evolution of large amounts of gas and ionized particles. However, the apparatus disclosed in aforementioned application Serial No. 298,882 includes a housing for the current limiting protective device separate from the housing for the electrical apparatus to be protected.

It is an object of the invention to provide electrical apparatus protected by internally mounted fuse means capable of interrupting current of short circuit magnitude which permits fast and easy fuse changes and does not necessitate opening of the apparatus casing. A further object is to provide electrical apparatus protected by internally mounted non-expulsion fuse means capable of interrupting primary overcurrents caused by faults within the apparatus and by short circuits on the secondary without a secondary breaker and which limits potentially high fault currents to low values.

These and other objects and advantages of the invention will be more readily apparent from the following detailed description when read in connection with the accompanying drawing wherein:

FIG. 1 is a partial sectional view through electrical apparatus having internally mounted current limiting protective means embodying the invention;
FIG. 2 is a view taken on line 2—2 of FIG. 1;
FIG. 3 is a view taken on line 3—3 of FIG. 1; and
FIG. 4 is a view taken on line 4—4 of FIG. 1.

Referring to the drawing, an encased electrical apparatus such as a distribution transformer is schematically illustrated as having a primary winding 10 and a secondary winding 11 housed within a metallic casing 12. One end of the primary winding 10 is connected to the metallic casing 12 which may be connected to ground. The other end of primary winding 10 may be connected by a conductor 16 through a load-break switch 14 to a conductive bolt 17 disposed at the lower end of a primary electrical insulating bushing 19 extending through an aperture 20 in casing 12. Conductor 16 may have a terminal 21 crimped thereto provided with an eye which fits over conductive bolt 17 and is affixed thereto by a nut 22. The shank 23 of insulating bushing 19 may be immersed in insulating dielectric liquid 24 within casing 12.

Insulating bushing 19 includes an elongated tubular porcelain member 25 having a plurality of skirts 26 thereon exterior of casing 12 and a shoulder 27 intermediate its ends which rests against a wall portion of casing 12 with a resilient gasket 28 compressed therebetween. An annular clamping member 29 surrounding shank 23 bears against a fibre ring 30 fitting within a circumferential groove 31 in shank 23. Bolts 32 engaged within threaded holes in clamping member 29 bear against the interior surface of the wall portion of casing 12 to clamp bushing 19 on casing 12.

Tubular porcelain member 25 has a transverse bottom wall 33 with a central aperture therein which receives conductive bolt 17. A generally U-shaped contact spring 34 is affixed against bottom wall 33 within the axial bore 35 in porcelain member 25 by bolt 17 which extends through a clearance aperture in the cross-piece of U-shaped contact spring 34 and is engaged by nut 22 exterior of bushing 19. A resilient gasket 36 is compressed within an annular groove 37 in the bottom wall 33 by a washer 38 beneath the head of bolt 17 to hermetically seal the lower end of porcelain member 25 against entry of dielectric liquid 24. The legs 40 of U-shaped contact spring 34 are generally of S-shape and are resiliently biased apart and provide high pressure contact against the internal surface of a square cross section portion of a conductive tube 41 which constitutes the bottom terminal of a current limiting fuse 42 disposed within axial bore 35. Contact spring 34 electrically connects conductor 16 to fuse 42 and prevents rotation of square cross sectional terminal 41, and thus of fuse 42, within insulating bushing 19.

An internally threaded tubular conductive terminal 44 is affixed to the upper end of fuse 42. A conductive terminal cap 45 has a circumferential flange 46 disposed against the open upper end of porcelain member 25. Terminal cap 45 has eyebolt connector means 48 on the upper end thereof adapted to engage and clamp a vertically extending power line conductor (not shown). Terminal cap 45 also has a depending axial threaded stud portion 49 adapted to engage the internal threads on upper fuse terminal 44. Surrounding stud portion 49 below terminal cap 45 are an annular washer 51 preferably of nylon, a resilient annular clamping gasket 52, and a conical metallic clamping washer 53, and these parts are retained as a unitary assembly by a split ring 55 engaged within a circumferential groove in stud portion 49. A tubular spacer 56 is disposed between conical clamping washer 53 and the upper end of fuse 42. Rotation of terminal cap 45 relative to tubular member 25 by a lineman advances fuse 42 (which is prevented from turning by contact spring 34) toward terminal cap 45 and consequently causes conical clamping member 53 to advance toward annular clamping gasket 52 and squeeze it against terminal cap 45, thereby forcing gasket 52 outward against the internal surface of porcelain member 25 to hermetically seal the open upper end of porcelain member 25 and mechanically hold fuse 42 within bushing 19 by means of friction. It will be appreciated that the disclosed construction permits fast and easy replacement of transformer primary fuse 42 without opening casing 12 or exposing the dielectric liquid 24 to the atmosphere. Primary fuse changes are fast and easy at the pole top and are accomplished by merely unscrewing terminal cap 45 and withdrawing fuse 42 from contact spring 34 in the base of bushing 19. Load-break switch 14 is immersed in the dielectric liquid 24 within the casing 12 and may be actuated by means extending through the casing to isolate the transformer primary winding 10 and assure complete safety to the lineman when replacing the fuse.

Current limiting fuse 42 includes a tubular enclosing casing 60 of suitable insulating material such as glass, fiber, or glass fiber impregnated with epoxy resin. Annular metallic end pieces 61 are affixed at the ends of fuse casing 60 by suitable means such as epoxy resin and radially extending headed pins 62 (see FIG. 3). The tubular terminals 41 and 44 are driven with a force fit into central openings in the end pieces 61, and pins 65 extend diametrically through the end pieces 61, fuse casing 60 and terminals 41 and 44 to securely hold these members together. An elongated insulating core, or spider 66, is axially mounted within fuse casing 60 and has reduced diameter portions 67 at its ends which fit within the axial opening in tubular terminals 41 and 44. Spider 66 is of generally star-shaped cross section and has a plurality of radially protruding, peripherally spaced apart, longitudinally extending fins 68 and preferably is of a material adapted to evolve gas in the presence of an arc as disclosed in the copending application of Harvey M. Mikulecky, Ser. No. 313,640, filed Oct. 3, 1963, now abandoned, and having the same assignee as the present invention and to which reference is made for details of construction. Spider 66 may be of a molded thermosetting composition comprising a water insoluble binder and an anti-tracking material selected from the class consisting of the hydrates and oxides of aluminum and magnesium. One suitable material for spider 66 comprises approximately 75 percent aluminum hydrate filler, 20 percent polyester resin binder, and approximately 5 percent glass fiber. Spider 66 serves to support a circuit interrupting fusible element which may comprise a fusible ribbon 69 of suitable material such as silver helically wound on spider 60 so as to be in approximate line contact with fins 68 and touch only peripherally spaced apart portions of spider 66. A bead 80 of low melting temperature alloy such as tin-lead solder is in intimate contact with the fusible ribbon 69 adjacent the midpoint thereof. The ends of fusible element 69 may be affixed by suitable means such as solder to radially bent cutout, or tab portions 70 on fuse terminals 41 and 44. Disposed within the interior of casing 60 and embedding the spider 66 and the fusible element 69 is a body of granular inert or refractory material 72 of high dielectric strength such as sand or finely divided quartz.

The fusible element 69 attains fusing temperature and vaporizes when subjected to short circuit current, whereupon arcing occurs and the metal vapors rapidly expand to many times the volume originally occupied by the fusible element and are thrown into the spaces between the granules of inert filler material where they condense and are no longer available for current conduction. The physical contact between the hot arc and the relatively cool granules causes a rapid transfer of heat from the arc to the granules, thereby dissipating most of the arc energy with very little pressure buildup within the fuse enclosure. Consequently, a high resistance is, in effect, inserted into the path of the current and initially limits the current to a magnitude which is only a small fraction of that available in the circuit. The inserted resistance increases rapidly and results in rapid decay of current and subsequent interruption of current with negligible generation of gas and noise. A conductive coating 74 on the exterior of fuse casing 60 adjacent the wall portion of transformer casing 12 and electrically connected to lower fuse terminal 41 constitutes an electrostatic shield which raises the voltage at which corona is initiated, and a high dielectric strength material such as insulating tape 76 covering the edge of coating 74 increases the fuse peak arc voltage at which flashover of current limiting fuse occurs, thereby substantially increasing the interrupting rating of the fuse as disclosed in the copending application of Raymond J. Bronikowski, Serial No. 413,800, filed November 25, 1964, now Patent No. 3,309,477 issued March 14, 1967, and having the same assignee as the subject invention. Fuse 42 is not only capable of interrupting fault current of short circuit magnitude on transformer primary winding 10, but it also provides consistent and reliable operation on relatively low magnitude fault currents which are only several times 100 percent load current on the transformer primary 10. Fuse 42 provides reliable current interruption in the current range of from approximately two and one-half times 100 percent load current on primary winding 10 up to current of short circuit magnitude on the primary winding, for example, up to 18,000 amperes asymmetrical and 12,000 amperes symmetrical through transformer ratings of 50 kva. on power systems of up to 8 kilovolts, and such range of current interruption is accomplished without a separate oil immersed expulsion fuse in series with the current limiting fuse.

Electrical apparatus embodying the invention is protected against fault currents of short current magnitude by an internally mounted device which interrupts without noise, flame or pressure and which limits the let-through current to a magnitude substantially smaller than the available fault current in the circuit. Replacement of the protective means of apparatus embodying the invention is fast and easy and does not necessitate opening of the interior of the apparatus casing to the atmosphere. Distribution transformers embodying the invention are protected against faults on the secondary without a secondary breaker which, in prior art apparatus, often caused interruption of customer service during heat storms and overloads. Further, distribution transformers embodying the invention improved coordination with system sectionalizing devices and permit utilities to extend the use of protected transformers to higher kva. ratings than was formerly possible.

While only a single embodiment of the invention has been illustrated and described, many modifications and variations thereof will be readily apparent to those skilled in the art, and consequently it is intended in the appended claims to cover all such modifications and variations which fall within the true spirit and scope of the invention.

I claim:

1. In combination, a metallic casing, electrical apparatus within said casing, a tubular ceramic bushing mounted on said casing and etxending through an aperture in said casing and being closed at its lower end, a metallic contact adjacent the lower end of the axial opening in said bushing, conductive means extending through a wall of said bushing for electrically connecting said contact to said electrical apparatus, a current limiting fuse positioned within the axial opening in said bushing and having a terminal at its lower end releasably engaged with said contact and a threaded terminal at its upper end, means for preventing rotation of said fuse within said bushing, a conductive terminal cap seated on the open upper end of said bushing and being rotatable relative to said bushing and having a threaded portion in engagement with said upper fuse terminal, whereby rotation of said terminal cap moves said fuse relative to said terminal cap, and means positioned between said terminal cap and said fuse including a resilient annular gasket and an annular member having a conical surface opposite said gasket for sealing said open end of said bushing and for holding said fuse within said axial opening, said resilient gasket being compressed between said terminal cap and said conical surface upon movement of said fuse toward said terminal cap, incident to rotation of said terminal cap, and being forced radially outward against the internal surface of said tubular bushing.

2. In combination, a metallic casing, electrical apparatus within said casing, a tubular ceramic bushing mounted on said casing and extending through an aperture in said casing and being closed at its lower end, a stationary metallic contact adjacent the lower end of the axial opening in said bushing, conductive means extending through a wall of said bushing for electrically connecting said contact to said electrical apparatus, a current limiting fuse positioned within the axial opening in said bushing and having a terminal at its lower end releasably engaged with said contact and a threaded terminal at its upper end, said contact and said lower fuse terminal having interfitting complementary non-circular portions, whereby said contact prevents rotation of the fuse within said bushing, a conductive terminal cap seated on the open upper end of said bushing and carrying connector means for releasably engaging a power line conductor and a depending threaded portion in engagement with said fuse upper terminal and being rotatable relative to said bushing, whereby rotation of said terminal cap moves said terminal cap and said fuse relative to each other, an annular gasket surrounding said depending portion, an annular member having a conical surface disposed toward said gasket and surrounding said depending portion, rotation of said terminal cap moving said fuse toward said terminal cap and compressing said gasket between said terminal cap and said conical surface and forcing said gasket outward against the internal surface of said tubular bushing.

3. In an apparatus having a metallic casing and an electrical device enclosed therein, the combination comprising, a tubular ceramic bushing mounted on said casing and having an open upper end and also having a closed lower end extending through an aperture into said casing, a stationary metallic contact having a non-circular portion supported on and positioned within the lower end of said bushing and having a conductive portion extending through said bushing and electrically connected to said electrical device, a current limiting fuse positioned within said bushing and having a threaded conductive upper terminal and also having a conductive lower terminal provided with a non-circular portion complementary to the non-circular portion of said metallic contact and being positioned in interfitting engagement with the non-circular portion of the stationary metallic contact, whereby the fuse is prevented from rotating within the bushing, a conductive terminal cap seated against the open end of said bushing and being rotatable relative to said bushing and having a threaded conductive member within said bushing engaging said threaded upper fuse terminal, whereby rotation of said terminal cap advances said fuse toward said terminal cap while said fuse is prevented from rotating, and means positioned between said terminal cap and said fuse and including a resilient annular gasket surrounding said threaded conductive member and movable into engagement with said bushing in response to pressure exerted thereon when said fuse is advanced toward said terminal cap for hermetically sealing the open end of said bushing and for mechanically holding the fuse within said bushing.

4. In an apparatus having a metallic casing and an electrical device enclosed therein, the combination comprising, a tubular ceramic bushing mounted on said casing and having an open upper end and also having a closed lower end positioned within said casing, a current limiting fuse positioned within said bushing and having a lower conductive terminal and an upper conductive terminal located adjacent the upper end of said bushing, means extending through a wall of said bushing for electrically connecting the lower end of said fuse to said electrical device and mechanically preventing rotation of said fuse within said bushing, a conductive terminal cap seated on the open upper end of said tubular bushing and carrying connector means for releasably holding a power line conductor and being rotatable relative to said bushing, conductive interengaging means between said upper fuse terminal and said terminal cap and electrically connecting said upper fuse terminal and said terminal cap together for moving said fuse relative to said terminal cap when said terminal cap is rotated and said fuse is held against rotation, and means including a resilient gasket positioned between said fuse and said terminal cap and responsive to movement of said cap and said fuse toward each other to seal the upper end of said bushing and to frictionally hold said fuse within said bushing.

5. In combination, a metallic casing, an electrical apparatus within said casing, a tubular ceramic bushing mounted on said casing and having an open upper end and having a closed lower end extending into said casing, a current limiting fuse positioned within said bushing and having upper and lower conductive terminals, said fuse being capable of interrupting current of short circuit magnitude on said apparatus and of limiting the current to a magnitude substantially smaller than the available short circuit current in the circuit of said apparatus and also being capable of interrupting current of overload magnitude on said apparatus, means extending through said bushing into the lower end of the bushing for electrically connecting said lower fuse terminal to said electrical apparatus, a conductive terminal cap seated on the open upper end of said tubular bushing, conductive means for releasably interconnecting said terminal cap and said upper fuse terminal, and means for holding said fuse in said bushing including means engaging said conductive means and being actuated from a position spaced apart from said bushing to a position engaging said bushing by rotation of said terminal cap relative to the bushing and the fuse for simultaneously sealing the open end of the bushing and holding said upper fuse terminal in position within the bushing.

6. In combination, a metallic casing having an aperture formed therein, electrical apparatus within said casing, a tubular ceramic bushing mounted on said casing and having an open upper end and also having a closed lower end extending through said aperture into said casing, a conductive element connected to said electrical apparatus and extending through said bushing into the lower end of the bushing, a current limiting fuse positioned within said bushing and including a tubular insulating housing, upper and lower conductive terminals on the ends of said housing, said lower conductive terminal being connected to said conductive elements, an insulating spider of a material adapted to evolve gas in the presence of an arc disposed axially within said housing, a fusible element interconnecting said terminals within said housing and supported on said spider and touching said spider at only spaced apart points along the length of said fusible element, and high dielectric strength granular material within said housing embedding said spider and said fusible element, said fuse being capable of interrupting current of short circuit magnitude on said apparatus and of limiting the current to a magnitude substantially smaller than the available short circuit current on said apparatus and also being capable of interrupting current in the range from approximately two and one-half times 100 percent load current on said apparatus to said current of short circuit magnitude, a terminal cap closing the open upper end of said bushing and carrying connector means for releasably engaging a power line conductor and being rotatable relative to said bushing, conductive means for releasably interconnecting said upper fuse terminal and said terminal cap, and means for holding said fuse on said bushing having two interfitting non-circular complementary portions respectively affixed to the lower fuse terminal and the closed lower end of the bushing and including means engaging said conductive means and being actuated from a position spaced apart from said bushing to a position engaging said bushing by rotation of said terminal cap relative to the bushing for simultaneously sealing the open end of the bushing and holding said upper fuse terminal in position within the bushing.

7. In combination, a metallic casing, insulating dielectric liquid within said casing, an electrical transformer having primary and secondary windings immersed in said liquid within said casing, a tubular ceramic bushing mounted on said casing and having a closed lower end immersed in said liquid, a current limiting fuse positioned within the axial opening in said bushing and having a threaded upper conductive terminal and a lower conductive terminal, said fuse being capable of interrupting current of short circuit magnitude on said primary winding and of limiting current to a magnitude substantially smaller than the available fault current in the circuit including said primary winding and also being capable of interrupting current in the range from approximately two and one-half times 100 percent load current on said primary winding to said current of short circuit magnitude, conductive means including a contact releasably engaging said lower fuse terminal and extending through a wall of said bushing for electrically connecting said lower fuse terminal to said primary winding, means for preventing rotation of said fuse within said bushing, a rotatable conductive terminal cap closing the open upper end of said bushing and carrying connector means for releasably clamping a power line conductor and having a threaded conductive portion connected to the threaded upper fuse terminal, whereby rotation of said terminal cap moves said fuse toward said terminal cap, and means positioned between said terminal cap and said fuse including a resilient annular gasket and an annular member having a conical surface opposite said gasket for sealing said open end of said bushing and for holding said fuse within said axial opening, said resilient gasket being compressed between said terminal cap and said conical surface upon movement of said fuse toward said terminal cap, incident to rotation of said terminal cap, and being forced radially outward against the internal surface of said tubular bushing.

8. In a protective device for electrical apparatus including a container having a rotatable cap and a fuse removably mounted and sealed within the container and having a terminal positioned adjacent said cap, the improvement comprising, means for preventing rotational movement of the fuse within said container, means connecting said terminal and said cap and being responsive to rotation of the cap to simultaneously move the fuse toward the cap and hold said fuse within the container, a member supported on said fuse and having a conical surface positioned adjacent to and facing said cap, and resilient means supported between said member and said cap and being actuated from a position engaging said cap and spaced apart from said container to a position engaging both the cap and the container for sealing the fuse within the container.

9. In a protective device for electrical apparatus including a container having a rotatable cap and a fuse removably mounted and sealed within the container and having a terminal positioned opposite and spaced apart from said cap, the improvement comprising, means having a non-circular shape for preventing rotational movement of the fuse within said container, means connecting said terminal and said cap and being responsive to rotation of the cap to move the fuse toward the cap and hold said fuse within the container, and means positioned between said cap and said fuse including a resilient annular gasket contacting said cap and an annular member having a conical surface opposite said gasket for sealing the fuse within said container, said resilient gasket being compressed between said cap and said conical surface upon movement of said fuse toward said cap.

References Cited

UNITED STATES PATENTS

| | | | |
|---|---|---|---|
| 1,058,143 | 4/1913 | Bitter et al. | 200—120 |
| 1,124,133 | 1/1915 | Hershey | 200—132 |
| 2,281,073 | 4/1942 | Leonard | 200—120 |
| 2,667,549 | 1/1954 | Fahnoe et al. | 200—120 |
| 3,178,613 | 4/1965 | Dornbush et al. | 317—15 |
| 3,244,838 | 4/1966 | Astleford | 200—120 |

FOREIGN PATENTS 577,805  5/1946  Great Britain.

BERNARD A. GILHEANY, *Primary Examiner.*

H. B. GILSON, *Assistant Examiner.*